Figure 6:
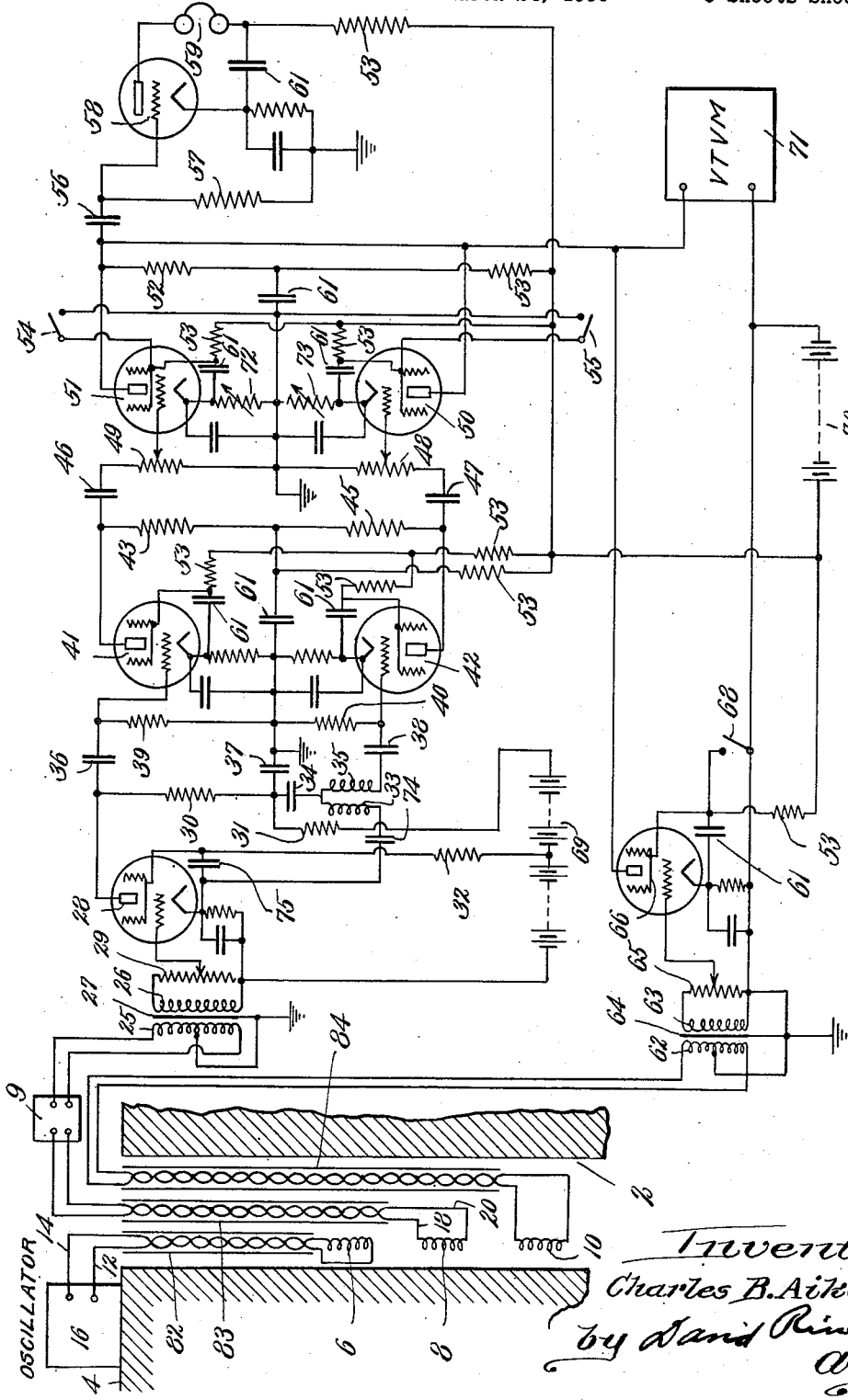

Nov. 5, 1940.  C. B. AIKEN  2,220,070
METHOD OF AND APPARATUS FOR MAGNETICALLY EXPLORING EARTH STRATA
Filed March 24, 1936   3 Sheets-Sheet 1
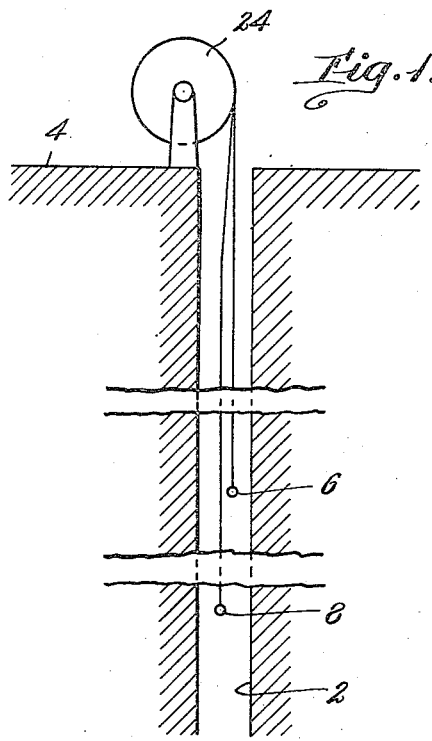
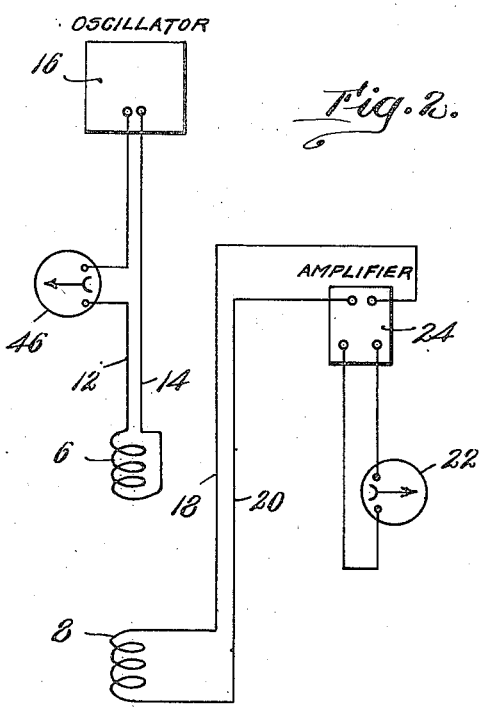
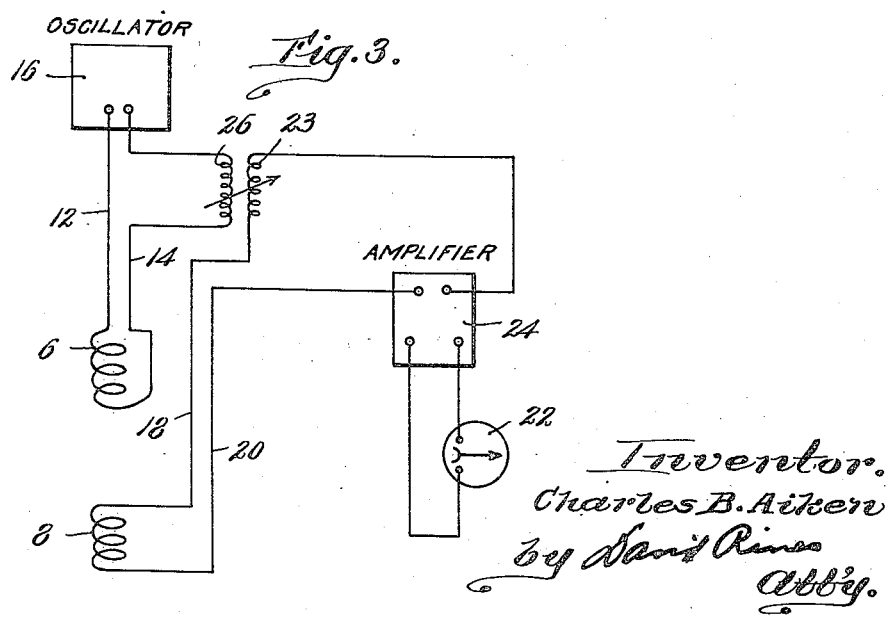
Inventor.
Charles B. Aiken
by David Rines
Atty.

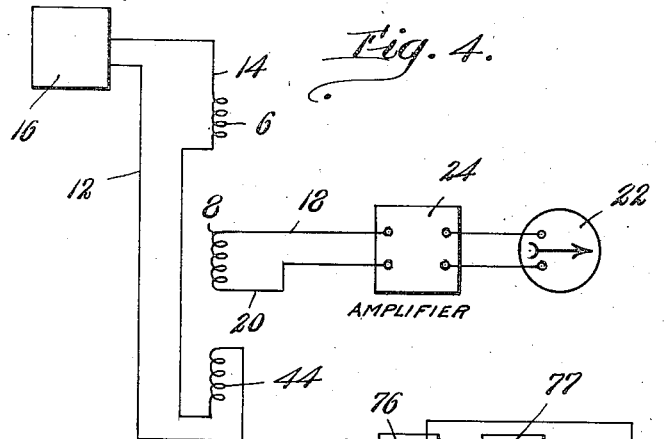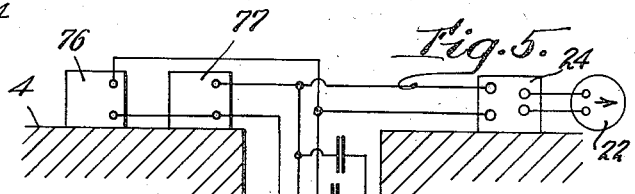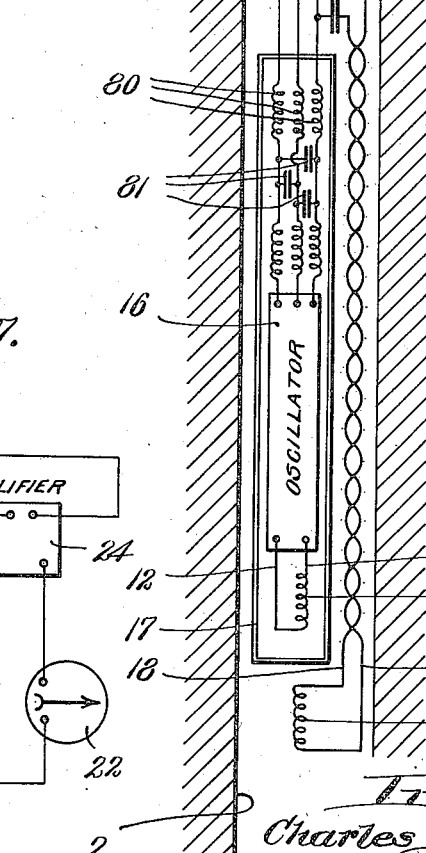

Nov. 5, 1940.                  C. B. AIKEN                    2,220,070
       METHOD OF AND APPARATUS FOR MAGNETICALLY EXPLORING EARTH STRATA
                        Filed March 24, 1936         3 Sheets-Sheet 3

Inventor.
Charles B. Aiken
by David Rines
Atty.

Patented Nov. 5, 1940

2,220,070

UNITED STATES PATENT OFFICE 2,220,070

METHOD OF AND APPARATUS FOR MAGNETICALLY EXPLORING EARTH STRATA

Charles B. Aiken, West Lafayette, Ind., assignor, by mesne assignments, to Schlumberger Well Surveying Corporation, Houston, Tex., a corporation of Delaware Application March 24, 1936, Serial No. 70,595

21 Claims. (Cl. 175—182)

The present invention relates to mineral exploration in the earth, using the term "mineral" in a generic sense, to include ore bodies, rocks, oil, water and the like. The invention is more particularly related to exploration of the above-described character that involves electromagnetic processes and, though having features of broader application, is specifically illustrated herein as employing magnetic fields.

An object of the present invention is to provide a new and improved method of and apparatus for exploring earth strata that shall be adapted to the measurement or detection of a characteristic property or properties of the strata dependent upon the electromagnetic constants of the ground. Usually it is primarily desired to detect changes in the electrical resistivity, but the method disclosed is also responsive to the magnetic permeability and to the dielectric constant at sufficiently high frequencies.

A further object is to provide a new and improved method of and apparatus for observing the phase and/or the amplitude of the electromagnetic field at various positions in the earth.

Other and further objects will be explained hereinafter and will be particularly pointed out in the appended claims.

The invention will now be explained in connection with the accompanying drawings, in which Fig. 1 is a diagrammatic view illustrating a principle underlying the present invention as applied to observations in a drill hole; Fig. 2 is a similar view, upon a larger scale, illustrating a simple arrangement of source and receiving circuits; Fig. 3 is a view, upon the same, larger scale, of a modification and illustrating further details; and Figs. 4 to 7 are similar views of further modifications, Fig. 6 illustrating one embodiment of a circuit for measuring phase and amplitude within the scope of the present invention.

Assuming that it is desired to explore the earth strata in the neighborhood of a drill hole 2 extending from the surface 4 down into the earth, whether vertically downward or inclined, the invention contemplates, according to the specific embodiments illustrated and described herein, the use of a plurality of source and receiver, electromagnetic coils that are lowered into the drill hole. A single source coil 6 and a single receiver coil 8 are illustrated in Figs. 1, 2, 3 and 5. A plurality of such source and receiver coils may, however, be employed, two receiver coils 8 and 10 being illustrated in Fig. 6 and two source coils 6 and 44 in Fig. 4. The two source coils 6 and 44 are illustrated in Fig. 4 as in series with the hereinafter-mentioned source 16 of alternating current, but the connection may be parallel, if desired.

The source and receiver coils are each connected to a pair of insulated, conducting wires, preferably twisted, as illustrated in Figs. 5 and 6, or encased in metal shields 82, 83 and 84, or both, in order to avoid false indications due to the transfer of energy between these wires. The wires for connecting the source coil 6 of Figs. 2, 3 and 6 or the source coils 6 and 44 of Fig. 4 are shown at 12 and 14. The wires for connecting the receiver coil 8 are similarly shown at 18 and 20. The wires 12 and 14 connect the coil 6 to the before-referred-to generator 16 of alternating current. The generator 16 may be an electric oscillator of any approved type and any convenient frequency, say, 10 cycles or less to 100,000 cycles or more. Alternating-current energy is thus conducted from the oscillator 16, by the wires 12 and 14, to the source coil 6. The generator 16 may be located at a fixed point on the surface 4 of the earth, near the drill hole 2, or it may be disposed in the drill hole, as illustrated in Fig. 5, preferably with a protective, waterproof casing 17 that may contain the coil 6 as well as the oscillator 16. Such an arrangement avoids danger of cross-talk between the source and receiver wires. If the oscillator be lowered into the drill hole, it may be desired to provide for remote tuning in some suitable manner; for example, by step-by-step switching in of a condenser or coils, or both; the switching being actuated, for example, by solenoids.

The source and the receiver coils may be lowered into the drill hole, preferably at fixed, relative positions to each other, in any desired manner, as by unwinding the conducting wires 12, 14, 18, 20, etc., from a drum 24 that is positioned on the earth's surface 4, just above, or to one side of, the drill hole, as illustrated in Fig. 1.

An alternating, electromagnetic field is thus created, surrounding the source coil 6 or the source coils 6 and 44, and electromotive forces are thus induced in the receiving coil 8 or the receiving coils 8 and 10, so that currents are caused to flow in the receiving circuits of these coils 8 and 10. It is not necessary that the space between the coils be conducting, as it is the alternating, magnetic field generated by the source coil or coils, and not an electric current, that is picked up by the receiver coil or coils. The energy received by the coils 8 and 10 is affected by the electromagnetic properties of the neighboring rock. This energy is amplified by an amplifier 24 and indicated on the meter 22. In the case of a plurality of coils 8 and 10, at different points of the drill hole, as in Fig. 6, the voltage induced in each may be separately recorded.

The circuits of the source coils 6 and 44 may be referred to as the source circuits, and the circuits of the receiver coils 8 and 10 as the receiver circuits. The receiving circuit of the coil 8 in Fig. 2, for example, comprises the wires 18 and 20 and a galvanometer, telephone, or other detecting instrument 22, with or without the amplifier 24; and the source circuit of the coil 6 shown in the same Fig. 2 comprises the wires 12 and 14, and the generator 16 with or without a meter 46 for measuring the current in the source coil 6.

The source circuit may be coupled to the receiver circuit or circuits, as by means of auxiliary elements comprising a coil 26 in the source circuit and a coil 23 in the receiver circuit, illustrated in Fig. 3. Such coupling is not absolutely essential to the carrying out of the present invention; as is clear from Fig. 2, for example, the measurements or other observations may be made without such aid, for the equivalent of the said auxiliary elements may be obtained by indirect coupling to the source circuit, by virtue of the proximity of the source coil 6 and the receiving coils 8 and 10 in the drill hole. The coils 26 and 23 may constitute a vario-coupler for variably coupling the source and receiver circuits inductively; and the coupling may be varied in such a way as to neutralize the signal picked up in the receiving circuit by the receiving coil 8. The signal received by the coil 8 is thus acted upon, through the medium of the coils 26 and 23, by the energy in the circuit of the coil 6, which is naturally proportional to the energy of the created field, and this action may be controlled by varying the coupling of the coils 26 and 23. The signal need not, of course, be wholly neutralized; it may be neutralized only in part and, indeed, as is clear from Fig. 2, the invention is operative even without any neutralization at all. The degree of neutralization may be observed with the aid of the instrument 22; complete neutralization would, for example, be indicated by a null reading of the galvanometer 22, if a galvanometer is employed.

After one such reading has been obtained, the source and receiver coils will be lowered further in the drill hole. The lowering is effected either by relatively short steps, a little at a time, or continuously, and observations are made with the galvanometer or other instrument 22, either at the end of each step of lowering movement or continuously. The observations may comprise measurements of voltage, current, amplitude, phase or other quantities characteristic of, or produced by, the electro-magnetic field of the source coil, as picked up by the receiver coil or coils in the neighborhood of the strata in which they are disposed. Such measurements will afford data from which to estimate the mineral characteristics of the explored strata.

Owing to the different resistivity or other electric properties of the wall-rock strata surrounding the source and receiver coils after any lowering step, the balance obtained prior to such lowering step will become upset. If, for example, the galvanometer 22 previously read zero, the reading will now, in general, be some other value, not zero. The difference in the readings may be used directly as a measure of the change in the wall rock; or, if preferred, a new neutralization or other adjustment may be made to restore the reading to its former value, and such new adjustment will furnish data from which an estimate may be made of the difference in the nature of the strata surrounding the source and the receiver coils in their various positions of lowering into the drill hole.

According to the arrangement illustrated in Fig. 4, the receiver coil 8 is maintained approximately half way between the oppositely wound source coils 6 and 44, so that no signal will normally be received in the coil 8, thus normally to produce a balance, in the absence of disturbing conditions. In the presence of an external, alternating, magnetic field, however, such as might be produced by a conducting body in the vicinity, the zero electromagnetic field produced by the source coils 6 and 44, at a point midway between them, would become distorted, as the zero point would then shift to some other than the midway point, thus causing the coil 8 to pick up a signal.

Useful data may also be obtained by varying the distance between source and receiver coils, keeping one or the other groups in a fixed position. This might be accomplished by moving one of them or by providing several receiver coils and means for switching first one and then another of them into circuit.

When the oscillator is lowered into the drill hole, as in Fig. 5, it will be preferable to place the supply batteries, such as the filament battery 76 and the plate battery 77, on the surface, as indicated. In order that no alternating current from the oscillator may flow up the battery supply leads, it is preferable to insert a low-pass electrical filter in these leads at the oscillator end. This filter may be made up of coils 80 and condensers 81, shown in Fig. 5. The leads for the receiver coil 8 may then be brought separately to the surface without danger of cross-talk from the oscillator supply leads; or, instead of using separate leads to the surface, the wires from the coil 8 may be connected to the battery supply leads, as indicated, thus effecting an economy of wire.

Instead of using a single receiver coil 8, a pair of such coils may be used, preferably disposed one on either side of the oscillator and its associated coil 6. By connecting two such receiver coils in series, opposing, and by properly adjusting them as to the number of turns and as to position, the total induced voltage in the receiver circuit can be made zero under normal conditions. When there is distortion of the electromagnetic field of the oscillator, caused by a conducting body lying near the drill hole, the total induced voltage will no longer be zero, and alternating energy will be conducted to the surface over the battery leads.

In Fig. 6, the wires 18 and 20 leading from the coil 8 are shown connected at the surface 4 to a convenient phase-shifting circuit 9, such as an artificial electric line. The output of this device is connected to the primary winding 25 of an input transformer having a secondary winding 26 and an interwinding shield 27. The center tap of the primary winding 25 is preferably connected to ground in order to maintain the balance of the circuit of the coil 8. The receiver circuit of the coil 10 is connected to the primary winding 62 of a transformer the secondary winding of which is shown at 63. This transformer is equipped with an interwinding shield 64, and balance is maintained in the same manner as described above in connection with the primary winding 25. As an alternative to the arrangement shown in Fig. 6, the coils 8 and 10 may be disposed one on either side of the coil 6. Instead of the two pick-up coils 8 and 10 of Fig. 6, one such coil only might be used in this system, together with a voltage derived directly from the source circuit.

It will now be explained how the signals received in the said two receiver circuits may be compared to indicate changes in the electrical conditions of the rock.

The secondary winding 26 of the first-named transformer is connected to a potentiometer 29 which, in turn, feeds the grid of a buffer, thermionic, vacuum tube 28, preferably of the screen-grid type. This buffer tube is supplied with plate and screen voltages by an ungrounded battery 69. The alternating plate current of the tube 28 flows through a resistor 30, a condenser 34, and the primary winding 33 of a mutual inductance, the secondary winding of which is shown at 35, and returns to the cathode of the tube 28 through a blocking condenser 74. The polarities of the windings 33 and 35 are so chosen that the voltage induced in the winding 35 is in phase with the voltage across the condenser 34. These two voltages are applied to the grid-cathode circuit of a tube 42. The continuous component of the plate current of the tube 28 flows from the battery 69, through the risistors 31 and 30, to the plate of the tube 28. The resistance of the resistor 31 is very large compared with the reactance of the condenser 34 and the winding 33 in series, so that the amount of alternating current which flows through the risistor 31 is negligible. One end of the resistor 30 and the adjacent plate of the condenser 34 are grounded through a condenser 37. A decoupling resistor 32, together with the by-pass condenser 75, prevent stray alternating-current energy from reaching the shield electrode of the tube 28.

The voltage across the resistor 30 is applied to the grid of a vacuum tube 41 through a blocking condenser 36. The tube 41 is provided with a usual type grid-leak resistor 39. The voltage across the condenser 34 and the voltage across the winding 35 are applied, in series, through a blocking condenser 38, to the grid-cathode circuit of the tube 42, which includes the grid-leak resistor 40. This voltage is in phase quadrature with that across the resistor 30.

The condenser 34 may alone be used to obtain the quadrature component of voltage, but the addition of the mutual inductance enables one, by properly cnoosing the magnitudes of the coils 33 and 35 and the condenser 34, to render the magnitudes of the voltage applied to the grid of the tube 42 independent of frequency over a small range. A substantially constant voltage pick-off is thus yielded over an appreciable frequency range. If the condenser alone were used, the voltage would, of course, be inversely proportional to the frequency. When the frequency is changed by a large amount, the values of elements 33, 34 and 35 should be changed to values appropriate to the new frequency, as by switching in new units.

The tubes 41 and 42 have resistive plate loads 43 and 45, respectively. Potentiometers 48 and 49, connected in parallel with the loads 43 and 45 in series, with a condenser 46 between the load 43 and the potentiometer 48 and a condenser 47 between the load 45 and the potentiometer 48, make it possible to adjust the quadrature and in-phase voltages which are applied to the grids of buffer tubes 50 and 51. The buffer tubes 50 and 51 are interposed between the potentiometers 49 and 48 and a final tube 58, the potentiometer 49 being connected to the grid of the tube 51 and the potentiometer 48 to the grid of the tube 50. The tubes 50 and 51 are provided with a common plate-load resistor 52, the voltage across which is applied to the grid of the final tube 58 through a blocking condenser 56, and across a grid leak resistor 57. In the plate circuit of the tube 58 is a telephone receiver or other indicator 59, which may be used to note conditions of balance.

The cathode resistors 72 and 73 of the tubes 51 and 50 may be made adjustable, for convenience, in order that the amplification of these tubes 51 and 50 may be controlled over a small range.

The vacuum tubes employed may be of either the filamentary type or of the equipotential-cathode type with separate heater. The latter type is shown in Fig. 6 but the heater circuits, which are of conventional type, are omitted for the sake of simplicity.

The output of the secondary winding 63 of the second-named transformer is connected across a potentiometer 65, which enables the voltage on the grid of a tube 66 to be adjusted. The tube 66 feeds the before-mentioned plate-load resistor 52. The alternating-current output of the tube 51 may be reduced to substantially zero by closing the switch 54, that of the tube 50 may be so reduced by closing the switch 55 and that of the tube 66 by closing the switch 68. The alternating voltage across the load 52 may be measured by means of a vacuum-tube voltmeter 71.

The several resistors 53 are decoupling resistors which, together with the by-pass condensers 61, prevent alternating-current energy from straying from one circuit to another.

In making an observation, the potentiometer 48 is set for zero output, and the potentiometer 49 for maximum output. The phase-shifting network 9 and the potentiometers 29 and 65 are then adjusted until there is a zero response in the telephones 59 or other indicator. This indicates that the outputs of the tubes 51 and 66 are equal in magnitude and opposite in phase. This preliminary adjustment should be made with the coils 6, 8 and 10 either near the upper end of the drill hole, or just outside of the geologic region to be surveyed.

The coils are then lowered a convenient distance and a new balance is obtained by adjusting the potentiometers 48, 49 and 65. The switches 55 and 68 are closed, thus greatly reducing the gain of the tubes 50 and 66, and the output of the tube 51 is then determined by measuring the voltage across the load 52 with the vacuum-tube voltmeter 71. The switch 54 is then closed, and the switch 55 opened, whereupon the voltage across the load 52 is again measured. These two measurements give the in-phase and quadrature components and magnitude of the voltage induced in the coil 8 relative to the voltage induced in the coil 10. As a check, the switch 68 is then opened and the switches 54 and 55 closed. The voltage across the load 52 is now that due to coil 10. The magnitude of this voltage should be equal to the square root of the sum of the squares of the voltages across the resistor 52 due to the outputs of the tubes 50 and 51 taken separately. By noting the amount by which the potentiometer 65 has been changed, the change in the magnitude of the voltage, due to the coil 10, compared with the voltage due to the coil 8, caused by the change in the position of the coils, can be ascertained. The variations in relative magnitude and relative phase of the voltages induced in the two coils 8 and 10 may thus be determined for a number of positions along the drill hole, the in-phase and quadrature components being compared merely by noting the readings of the three potentiometers. These potentiometers should be of such high resistance that they have no shunting effects in the circuits in which they are disposed.

This apparatus will measure phase shifts up to ±90 degrees, which would ordinarily be adequate for practical applications, over a rather wide range of frequencies. To take care of larger shifts, where desired, the resistor 43 may be replaced by a transformer the secondary winding of which is connected through a pole-changing switch to the potentiometer 49. The resistor 45 would similarly be replaced by a transformer and a switch. The blocking condensers 46 and 47 would, of course, be unnecessary. Pole-changing switches for both the quadrature and in-phase components are quite necessary when changes of more than ±90 degrees must be measured, but undesirable in that transformers must be used. In order to avoid error, these transformers should have identical phase shifts throughout the range of frequencies employed.

It is thus possible, in accordance with the modification of Fig. 6, not only to neutralize the signal, but also to compensate separately for both phase and amplitude, and readily to compare them with a reference value, thus affording further data for determining the nature of the strata surrounding the drill hole at various depths. The vacuum-tube voltmeter 71 and the switches enable one to obtain separate measurements of these components.

A systematic survey may also be made in which frequency is the principal variable. At each station, the relative phase and magnitude of the voltages induced in the two coils are measured at each of several frequencies. The coils are then moved to another station, and the sequence of observations at different frequencies is repeated. In some cases, this may yield information which could not be derived from a set of observations made at different positions but at the same frequency.

When a wide frequency range is covered, it may be necessary to switch in different source and receiver coils for different portions of the range. This may be done by using switches that are controlled by electrical impulses sent down along the wires from the surface, or by similar means well known to the art. If the oscillator itself is lowered into the hole, as in Fig. 5, its frequency must also be controlled by remote means, if a frequency run is to be made.

The apparatus which has been disclosed may be used to detect the presence of conducting bodies lying near the hole by still another means. If the coil 6 of Fig. 2 is made a portion of the tuned circuit of the oscillator, or is properly coupled thereto, any change in the effective inductance of the coil 6 will cause a shift in the frequency generated by the oscillator. This shift may be detected by any one of a number of suitable indicating devices that are well known to the art.

Such a method of exploration is also possible when the oscillator is lowered into the drill hole, as in Fig. 5. In this case, it is possible to dispense with the receiving coil 8 and also with the low-pass filters made up of the elements 80 and 81. The frequency of the oscillator is measured at the surface by suitable means, and changes in this frequency are noted when the coil 6, which is part of the tuned circuit of the oscillator, is in the vicinity of a conducting body.

For simplification, the buffer tube 28 might be omitted, and the potentiometer 26, instead of being connected to the grid and the cathode of the tube 28, would be connected to the upper end of the resistor 30 and the lower end of the coil 33. The battery 69, the decoupling resistors 31 and 32, and the condensers 74 and 75 would also be omitted. Due to the fact that no direct-current potential would then exist across the elements 30 or 34, the condensers 36 and 38 and the resistors 39 and 40 could be omitted. Further simplification could be achieved by omitting the tube 66 and the potentiometer 65, and connecting the transformer winding 63 across the resistor 52. These simplifications would, however, impose more severe requirements on the input transformers and other apparatus, and would make the equipment less convenient to manipulate. Triodes may be used, but the grid-plate capacities would tend to cause trouble at the higher frequencies. Other modifications and variations are also possible, and all such are considered to fall within the spirit and scope of the invention as defined in the appended claims.

What is claimed is:

1. Apparatus for electromagnetically exploring a drill hole comprising means for creating a varying magnetic field in the earth strata surrounding the drill hole, a receiving circuit for picking up a signal from the magnetic field at different positions of the magnetic field along the drill hole, means for avoiding the pick-up of a signal by parts of the receiving circuit removed from said positions, and means for observing differences in phase and amplitude of the field at the said different positions.

2. Apparatus for magnetically exploring earth strata comprising two oppositely wound electromagnetic coils, means for sending an alternating current through the coils, a third electromagnetic coil in inductive relation to the first-named coils at a point such that the resultant field of the first-named coils is substantially zero under reference conditions, means for observing a characteristic of the current induced in the third coil when in the presence of a conducting body, and means for moving the coils over various positions over the earth strata to be explored.

3. A method of exploring a drill hole that comprises supplying energy from a power source to create a varying magnetic field in a desired region of the drill hole, receiving a signal from the created field at a specified point of the said region and at no other point, whereby the received signal will be influenced by the nature of the geologic structure of the region, combining current or voltage derived from the received signal with current or voltage derived from the power source, and observing properties of the combined currents or voltages.

4. Apparatus for exploring the geologic structure in the vicinity of a drill hole comprising a device for producing alternating current, means for lowering the device into the drill hole, a source of energy for the device positioned on the surface of the earth, means connecting the device with the source, a filter connected between the device and the source, a source coil or coils, means for supplying the coil or coils with currents from said device, a receiver coil or coils disposed along the drill hole in such manner that the field of said source coil or coils will induce electromotive forces in said receiver coil or coils, and means for observing a property or properties of said induced electromotive forces.

5. A method of electromagnetically exploring a drill hole in the earth comprising making observations of the phase difference between two points of a varying magnetic field in the drill hole, maintaining the observed phase difference free from the effects of electromagnetic action in regions remote from said two points, and moving the said two points of observation to various positions in the electromagnetic field in the drill hole.

6. A method of electromagnetically exploring a drill hole in the earth comprising creating a varying magnetic field in various positions in the drill hole, making observations of the phase difference of the said field at two points, observing the relative amplitude of the field at the said two points, maintaining the observed phase difference and relative amplitude free from the effects of electrometic action in regions remote from said two points, and moving the said two points of observation to various positions in the electromagnetic field in the drill hole.

7. Apparatus for electromagnetically exploring earth strata surrounding a drill hole, comprising a generator of alternating current, a configuration of current-carrying windings, means for supplying said windings with current from said generator, a plurality of receiver coils in inductive relation to said windings, means for selectively switching the receiver coils into circuit, and means for observing a property or properties of the electromotive forces induced in the receiver coil or coils.

8. A method of electromagnetically exploring a drill hole in the earth that comprises transmitting alternating-current energy long distances from the surface of the earth down into the drill hole to create a varying magnetic field in various positions in the drill hole, picking up signals from the created field at points removed at a substantially constant distance from the said positions and at no other points, whereby the picked-up signals will be influenced by the nature of the geologic structure in the neighborhood of the said points, conveying the energy of the picked-up signals to the surface of the earth, acting upon the picked-up signals by means of energy proportional to the energy of the created field, and controlling the said action.

9. A method of exploring drill holes which comprises providing a source of energy, supplying energy from the source to create a varying magnetic field in the region surrounding the drill hole, receiving a signal from the field at predetermined points of the drill hole and at no other points, and combining the received signal with a controlled amount of energy derived from said source, whereby an indication of the character of the earth strata surrounding the drill hole may be obtained.

10. A method of exploring a drill hole in the earth comprising creating a varying electromagnetic field in various positions in the drill hole, inducing electromotive forces in receiving coils placed near said positions, transmitting signals resulting from said induced electromotive forces to the surface of the ground, compensating for phase shifts of said signals produced in the transmission thereof and making measurements upon said compensated signals.

11. A method of electromagnetically exploring the strata in the vicinity of a drill hole comprising lowering a source of electrical oscillations into the drill hole, creating an electromagnetic field by means of said oscillations, conducting a portion of the output of said source to the surface without frequency conversion, and observing changes in the frequency of said source as it is lowered along the hole.

12. Apparatus for exploring the geologic structure in the vicinity of a drill hole comprising a device for producing alternating current, a source coil or coils in the drill hole, conductors in the drill hole connecting the coil or coils with said current-producing device, a receiver coil or coils disposed along the drill hole in such manner that the field of said source coil or coils will induce electromotive forces in the receiver coil or coils, an indicator for indicating a property or properties of said induced electromotive forces, conductors in the drill hole connecting the receiver coil or coils with the indicator, means for lowering the conductors in the drill hole to lower the coils to different positions along the drill hole, and means for preventing the transfer of energy between the conductors to avoid false indications of the indicator.

13. Apparatus for exploring the geologic structure in the vicinity of a drill hole comprising a device for producing alternating current, a source coil or coils in the drill hole, conductors in the drill hole connecting the coil or coils with said current-producing device, a receiver coil or coils disposed along the drill hole in such manner that the field of said source coil or coils will induce electromotive forces in the receiver coil or coils, an indicator for indicating a property or properties of said induced electromotive forces, conductors in the drill hole connecting the receiver coil or coils with the indicator, means for lowering the conductors in the drill hole to lower the coils to different positions along the drill hole, means for preventing the transfer of energy between the conductors to avoid false indications of the indicator, and means for varying the relative distance between the source coil or coils and the receiver coil or coils.

14. Apparatus for exploring the geologic structure in the vicinity of a drill hole comprising a device for producing alternating current, a source coil or coils in the drill hole, conductors in the drill hole connecting the coil or coils with said current-producing device, a receiver coil or coils disposed along the drill hole in such manner that the field of said source coil or coils will induce electromotive forces in the receiver coil or coils, an indicator for indicating a property or properties of said induced electromotive forces, conductors in the drill hole connecting the receiver coil or coils with the indicator, means for lowering the conductors in the drill hole to lower the coils to different positions along the drill hole, means for preventing the transfer of energy between the conductors to avoid false indications of the indicator, and means for variably coupling the circuits of the source coil or coils and the receiver coils or coils.

15. Apparatus for exploring the geologic structure in the vicinity of a drill hole comprising a device for producing alternating current, a source coil in the drill hole, conductors in the drill hole connecting the coil with said current-producing device, receiver coils disposed along the drill hole in such manner that the field of said source coil will induce electromotive forces in the receiver coils, an indicator, conductors in the drill hole connecting the receiver coils with the indicator, means for lowering the conductors in the drill hole to lower the coils to different positions along the drill hole, means for evidencing in the indicator differences in phase of the said field at two points in the drill hole separated by a predetermined distance, and means for preventing the transfer of energy between the conductors to avoid false indications of the indicator.

16. Apparatus for exploring the geologic structure in the vicinity of a drill hole comprising a device for producing alternating current, a source coil in the drill hole, conductors in the drill hole connecting the coil with said current-producing device, receiver coils disposed along the drill hole in such manner that the field of said source coil will induce electromotive forces in the receiver coils, an indicator, conductors in the drill hole connecting the receiver coils with the indicator, means for lowering the conductors in the drill hole to lower the coils to different positions along the drill hole, means for evidencing in the indicator differences in amplitude of the said field at two points in the drill hole separated by a predetermined distance, and means for preventing the transfer of energy between the conductors to avoid false indications of the indicator.

17. Apparatus for exploring the geologic structure in the vicinity of a drill hole comprising a device for producing alternating current, a source coil in the drill hole, conductors in the drill hole connecting the coil with said current-producing device, receiver coils disposed along the drill hole in such manner that the field of said source coil will induce electromotive forces in the receiver coils, an indicator, conductors in the drill hole connecting the receiver coils with the indicator, means for lowering the conductors in the drill hole to lower the coils to different positions along the drill hole, means for evidencing in the indicator differences in phase and amplitude of the said field at two points in the drill hole separated by a predetermined distance, and means for preventing the transfer of energy between the conductors to avoid false indications of the indicator.

18. Apparatus for exploring the geologic structure in the vicinity of a drill hole comprising a source of alternating energy, a source coil or coils in the drill hole, conductors in the drill hole connecting the coil or coils with said source of energy, a receiver coil or coils disposed along the drill hole in such manner that the field of said source coil or coils will induce electromotive forces in the receiver coil or coils, an indicator, conductors in the drill hole connecting the receiver coil or coils with the indicator, means for lowering the conductors in the drill hole to lower the coils to different positions along the drill hole, means connected with the indicator for causing the indicator to indicate a comparison of the intensity of the source and the intensity of the signal induced in the receiver coil or coils, and means for preventing the transfer of energy between the conductors to avoid false indications of the indicator.

19. Apparatus for magnetically exploring earth strata surrounding a drill hole comprising a source circuit having a source of alternating current, a coil or coils for setting up an alternating magnetic field at various positions in the drill hole, a shielded transmission line in the hole connecting said current source to said coils, a receiver circuit having a receiver coil or coils positioned near said first coil or coils, an electrical indicator, a second shielded transmission line in the hole connecting said receiver coil or coils with said indicator, means for lowering all said coils and conductors along a drill hole, means at the surface of the ground for variably coupling the source and receiver circuits, and means for showing the degree of coupling to produce whole or part neutralization of the signal impressed upon the electrical indicator.

20. Apparatus for exploring the earth strata surrounding a drill hole comprising a configuration of current-carrying windings, a configuration of receiver windings so related to said current-carrying windings that, in the absence of electrically unhomogeneous bodies in the near-by soil, a substantially zero signal will be induced in said receiver windings, while, in the presence of an electrically disturbing body, an observable signal will be produced in said receiver windings, and means for lowering all said windings along the drill hole.

21. Apparatus for exploring a drill hole comprising a configuration of current-carrying windings, a source circuit on the surface of the earth, a shielded transmission line connecting said windings to said source circuit, a configuration of receiver windings so related to said current-carrying windings that, in the absence of a disturbing body, a substantially zero signal will be induced in the receiver windings, an electrical indicator on the surface of the earth, a shielded transmission line connecting said receiver windings to said indicator, and means for lowering all said windings along the drill hole.

CHARLES B. AIKEN.

CERTIFICATE OF CORRECTION.

Patent No. 2,220,070.  November 5, 1940.

CHARLES B. AIKEN.

It is hereby certified that error appears in the printed specification of the above numbered patent requiring correction as follows: Page 3, first column, line 27, for "risistors" read --resistors--; line 32, for "risistor" read --resistor--; page 5, first column, line 19, claim 6, for "electrometic" read --electromagnetic--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.